(12) United States Patent
Ellis et al.

(10) Patent No.: US 7,448,040 B2
(45) Date of Patent: **\*Nov. 4, 2008**

(54) TRANSFERS OF INFORMATION IN A COMMUNICATIONS NETWORK

(75) Inventors: John R. Ellis, Woodside, CA (US); David K. Gifford, Weston, MA (US); G. Winfield Treese, Newton, MA (US)

(73) Assignee: Soverain Software LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/619,964

(22) Filed: Jan. 4, 2007

(65) Prior Publication Data

US 2007/0174847 A1  Jul. 26, 2007

Related U.S. Application Data

(60) Continuation of application No. 09/645,933, filed on Aug. 25, 2000, now Pat. No. 7,191,447, which is a division of application No. 08/548,137, filed on Oct. 25, 1995, now abandoned.

(51) Int. Cl.
*G06F 3/00* (2006.01)
*G06F 15/173* (2006.01)
(52) U.S. Cl. .................................. 719/310; 709/223
(58) Field of Classification Search ................ 719/319, 719/310; 709/223
See application file for complete search history.

(56) References Cited

U.S. PATENT DOCUMENTS 4,503,499 A   3/1985   Mason et al.
4,714,996 A   12/1987  Gladney et al.

(Continued)

OTHER PUBLICATIONS

Sengoku, "Hypertext Type Information Providing Information Retriever Device", Sep. 24, 1999.

(Continued)

*Primary Examiner*—Meng-Ai An
*Assistant Examiner*—Lechi Truong
(74) *Attorney, Agent, or Firm*—Jones Day

(57) ABSTRACT

The invention features various techniques for managing transfers of information in public packet switched communications networks. In one aspect, the invention provides a system for identifying updated items of network-based information, such as pages, to users in a network. A master server receives the data from each of a plurality of network servers and merges them into one or more master logs. The logs have entries that pertaining to creation of or changing of pages of information. Another aspect of the invention features a system for implementing security protocols. A proxy server translates links from a protocol incompatible with the network tool to a protocol compatible with the network tool and back-translates the link. Another aspect of the invention features a system for managing authenticating credentials of a user. A proxy server manages a user's authenticating credentials automatically on behalf of the user. Another aspect of the invention features a system for inducing advertisers to target advertisements to consumers. An advertising broker receives advertisements and messages indicating that users. Have read the advertisements, and causes an offer having monetary value to be executed. Another aspect of the invention features a system for extracting data from sources of network-based information in a communications network. An object embedding-program locates a script program and causes the script program to extract data from a page of information.

17 Claims, 6 Drawing Sheets

U.S. PATENT DOCUMENTS

| | | | |
|---|---|---|---|
| 4,850,007 A | 7/1989 | Marino et al. | |
| 5,235,642 A | 8/1993 | Wobber et al. | |
| 5,241,594 A | 8/1993 | Kung | |
| 5,434,994 A | 7/1995 | Shaheen et al. | |
| 5,446,919 A | 8/1995 | Wilkins | |
| 5,467,269 A | 11/1995 | Flaten | |
| 5,515,270 A | 5/1996 | Weinblatt | |
| 5,550,984 A | 8/1996 | Gelb | |
| 5,560,008 A | 9/1996 | Johnson et al. | |
| 5,564,044 A * | 10/1996 | Pratt | 718/106 |
| 5,584,025 A | 12/1996 | Keithley et al. | |
| 5,586,260 A | 12/1996 | Hu | |
| 5,614,927 A | 3/1997 | Gifford et al. | |
| 5,715,314 A | 2/1998 | Payne et al. | |
| 5,724,424 A | 3/1998 | Gifford | |
| 5,896,533 A * | 4/1999 | Ramos et al. | 709/217 |
| 5,991,802 A | 11/1999 | Allard et al. | |
| 6,301,703 B1 | 10/2001 | Shank et al. | |
| 6,728,933 B1 | 4/2004 | Heenehan | |

OTHER PUBLICATIONS

Thornton, John, "OLE in Notes", Jan. 4, 1999.

Kwan, W. et al., "An Intelligent Agent for Multimedia Newspaper", IEEE 0-7803-2766-7-9/95; pp. 594-597; 1995.

Microsoft Corporation, "Microsoft Mail for Windows", Version 3.2A "Registered Mail" Feature Printout; Copyright 1992.

Rodriguez, Karen, "Individual to Tap Internet with an Agent-Based News Service (Individual Inc.'s First for Mosaic)"; InfoWorld; vol. 16, No. 43, p. 58(1); Oct. 24, 1994.

Gifford, David K., U.S. Appl. No. 08/168,519, filed Dec. 16, 1993.

Payne, Andrew C. et al., U.S. Appl. No. 08/328,133, filed Oct. 24, 1994.

Gifford, David K. et al., "Payment Switches for Open Networks", Open Market, Inc., 245 First Street, Cambridge, Massachusetts 02142, Mar. 1995.

Solinsky, Jason W., "Advertising Will it Work?", e-mail message received from owner-online-news@marketplace.com; Jul. 5, 1994.

Goulde, Michael A., "WorldWide Web Servers", Open Information Systems, Sep. 1995, vol. 20, No. 9.

* cited by examiner

TRANSFERS OF INFORMATION IN A COMMUNICATIONS NETWORK

PRIORITY CLAIM

The present application is a continuation of, claims priority to and the benefit of U.S. patent application Ser. No. 09/645,933, filed Aug. 25, 2000, now U.S. Pat. No. 7,191,447 which is a divisional of U.S. patent application Ser. No. 08/548,137, filed on Oct. 25, 1995, now abandoned the entire contents of which are incorporated herein.

BACKGROUND

This invention relates to managing transfers of information in communications networks such as the World Wide Web.

One aspect of the invention relates to managing queries for new or changed items of network-based information. Many services provide standing queries over streams of information such as news wires, e-mail, bulletin boards, and stock quotations. These services are sometimes called "information filters," "continuous queries," or "clipping services." "News Edge and Compuserve are two examples of such services.

Another aspect of the invention relates to using proxy servers to implement security protocols on behalf of network tools and to manage sets of authentication credentials for users. Existing corporate networks often include a gatekeeper or proxy or fire-wall server that provides a single point of entry and exit from the corporate network to the rest of the world. The network browsers on the corporate network create network requests, and the proxy server forwards them to servers on the Internet. The proxy intercepts all traffic to and from each browser, and ensures that only a very restricted set of traffic and people can access the corporate network from the outside.

Another aspect of the invention relates to inducing advertisers to target advertisements to consumers for whom the advertisements are likely to be of interest. On the Internet it is presently possible for advertisers to do direct advertising to individual consumers by broadcasting "junk mail" that appears in user e-mail and network bulletin boards.

Another aspect of the invention relates to extracting data from sources of network-based information on a communications network. Object embedding tools are known such as OLE (Object Linking and Embedding) and OpenDoc that are used to build compound documents. These tools contain a link to an object that the tool embeds within a compound document such as a word-processor document or a spreadsheet. If the object changes, the compound document changes accordingly.

SUMMARY

In one aspect, the invention features a system for identifying updated items of network-based information to users in a public packet switched communications network that includes a plurality of network servers. The system includes a master log server and a plurality of user computers. The master log server periodically receives data from at least some of the plurality of network servers. The master log server causes the data to be assembled into a one or more master logs having a plurality of entries. Each of the master logs includes at least one entry. Each entry pertains to creation of or changing of an item of network-based information, such as a page of information,, that has occurred within a predetermined time span. The master log server causes at least some of the entries in the one or more master logs to be transmitted to one of the user computers. The user computer receives a user query comprising a request to provide to a user at least a subset of the entries in the one or more master logs, wherein each of the entries in the subset matches a search pattern contained in the user query. The search pattern includes an identification of a time period. The user computer causes the user query to be executed by providing to the user, from each of the one or more master logs into which data has been assembled within the time period, the subset of the entries.

In one embodiment, the data received by the master log server from the network servers comprises logs having entries pertaining to creation of or changing of items of network-based information. In another embodiment, the master log server is programmed to compute log entries for network servers that do not forward logs to the master log server, by directly querying the servers and comparing the current contents of the servers to the master log or logs, which indicate when the contents of each server was last noticed to change.

By providing a master server that receives data from each of a plurality of network servers and assembles the data into one or more master logs, and user computers provide entries in response to queries limited to particular time periods, the invention provides a set of efficient logs that enable user queries limited to particular time periods to be executed on the World Wide Web, which has thousands of the network servers each with its own unique content, without requiring the user computer to communicate with each of the network servers.

Another aspect of the invention features a system for implementing security protocols in a public packet switched communications network comprising a plurality of network servers that receive requests from users for items of network-based information and that transmit the items of network-based information to the users in response to the requests. A network tool, implemented on a computer, receives a first item of network-based information that includes a link in a protocol compatible with the network tool. In response to user input selecting the link, the network tool creates a request for the second item of network-based information. The request includes the link. A proxy server, implemented on a computer, receives the first item of network-based information from one of the network servers, wherein the link is in a protocol incompatible with the network tool, translates the link into the protocol compatible with the network tool, and transmits to the network tool the first item of network-based information, with the link being translated into the protocol compatible with the network tool. The proxy server receives the request for the second item of network-based information from the network tool, retrieves the link from the request, back-translates the link into the protocol incompatible with the network tool, and requests the second item of network-based information from one of the network servers.

By providing a proxy server that translates links from a protocol incompatible with the network tool to a protocol compatible with the network tool and that back-translates the link, the invention enables Web browsers and tools that don't implement Web security protocols such as SSL and SHTTP to access information that would otherwise be unavailable to these browsers and tools.

Another aspect of the invention features a system for managing authenticating credentials of a user of a public packet switched communications network that includes a plurality of network servers that receive requests from users for items of network-based information and transmit the items of network-based information to the users in response to the requests. A network tool, implemented on a computer, creates a request for an item of network-based information from one of the network servers in response to input from a user, and receives the item of network-based information in response to the request. A proxy server, implemented on a computer, maintains a table of authenticating credentials for each of the plurality of network servers, receives the request from the network tool, and forwards the request to the network server. The proxy server receives a request for authentication from the one of the network servers, retrieves from the table authenticating credentials for the network server, transmits the authenticating credentials to the network server, receives the item of network-based information from the network server, and forwards the item of network-based information to the network tool.

By providing a proxy server that manages a user's authenticating credentials automatically on behalf of a user, the invention enables the user to avoid having to assume the responsibility of managing and remembering a large number of differing authenticating credentials, or having to use the same authenticating credentials for a large number of services. Using the same authenticating credentials for a large number of services can increase the risk that a breach, in security in connection with one service will affect other services. Moreover, a user may be able to use a particular set of authenticating credentials in connection with one service but not another service, for example if one of the credentials is already being used by another user of the other service. The invention avoids the annoyance to the user of having to type in a user ID and password each time the user visits a subscription service.

Another aspect of the invention features a system for inducing advertisers to target advertisements to consumers in a public packet switched communications network that includes a plurality of network advertiser servers that transmit advertisements. The system includes an advertising broker server and a plurality of user computers. The advertising broker server receives advertisements from each of the network advertiser servers. Each of the advertisements is targeted toward at least one of a plurality of users served by the advertising broker server and is accompanied by an offer having monetary value for acceptance of the advertisement. The advertising broker server transmits at least one of the advertisements to one of the user computers operated by a user targeted by the advertisement. Each one of the plurality of user computers receives advertisements from the advertising broker server and, whenever a user of the user computer has read an advertisement, sends a message to the advertising broker server indicating that the user has read the advertisement. The advertising broker server receives the message indicating that the user has read the advertisement, and, in response thereto, causes the offer having monetary value to be executed.

By providing an advertising broker programmed to receive advertisements and messages indicating that users have read the advertisements, and to cause an offer having monetary value to be executed, the invention induces advertisers to target advertisements to consumers and induces the consumers to read the advertisements. Thus, the invention provides a substitute for direct broadcasting of "junk mail" to users for whom the advertisements are not of interest and who must separate such direct advertising from important personal and work messages.

Another aspect of the invention features a system for extracting data from sources of network-based information in a communications network that includes a plurality of network servers programmed to transmit network-based information over the network. A script program, implemented on a computer in the communications network, extracts data from network-based information provided by one of the network servers. An object embedding program, implemented on a computer in the communications network, includes a link to the network-based information provided by the network server and a link from which the object embedding program can locate the script program. The object embedding program applies the script program to the network-based information so as to cause the data to be extracted from the network-based information, and embeds the data within a compound document implemented on a computer in the communications network.

By providing an object embedding program that can locate a script program and cause the script program to extract data from an item of network-based information, the invention enables users to extract data from Web pages or other items of network-based information and embed it in documents, including spreadsheets and other applications, without including extraneous content from the Web pages, yet while enabling the extracted information to change whenever the Web pages change.

BRIEF DESCRIPTION OF THE DRAWINGS

The various objects, advantages and novel features of the present disclosure will be more readily apprehended from the following Detailed Description when read in conjunction with the enclosed drawings, in which.

DETAILED DESCRIPTION

Figure 1:
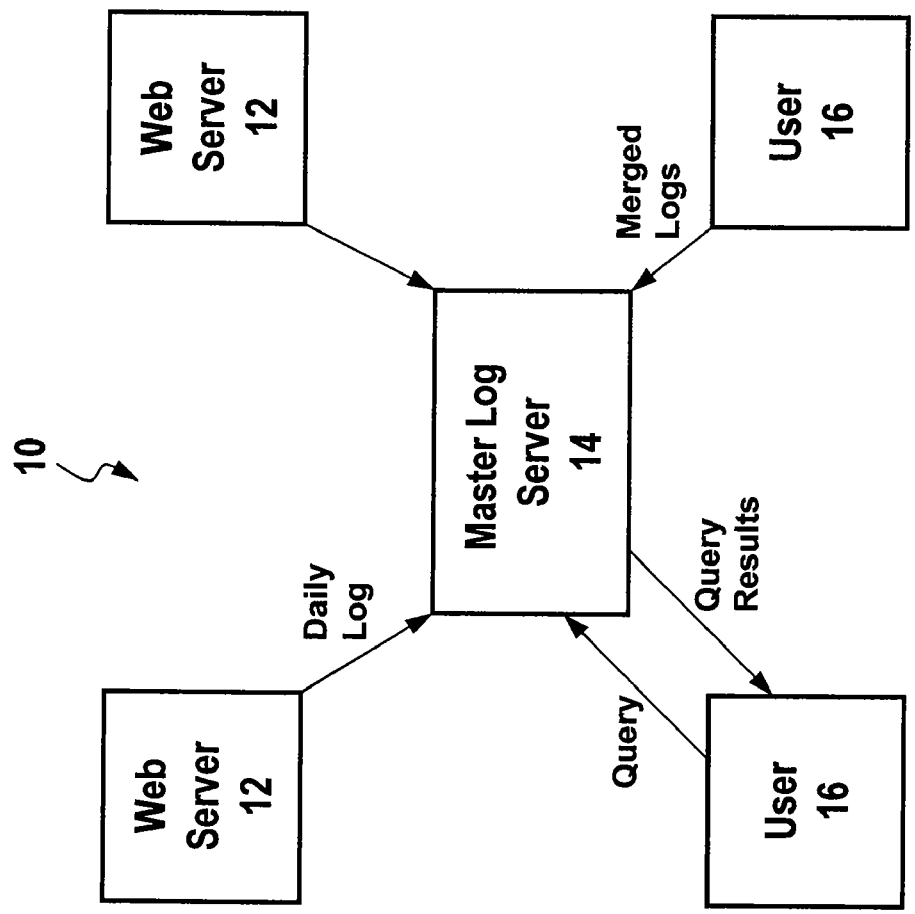
FIG. 1 is a diagram of a system for providing updated pages, or other items of network-based information, to users in accordance with the invention.

With reference to FIG. 1, in the World Wide Web network 10, each of thousands of Web servers 12 prepares daily compressed logs of pages of information (or other informational objects such as programs, multimedia content, or files) that are new or have changed within the last day. The logs contain entries of the form: <URL, time, content tags, title>. The "URL" is a universal resource locator that identifies a particular page or other item of information that is new or has changed. The "time" is the date and time when the page has most recently been modified. The "content tags" are a set of short classifications of the page's contents. These tags, which identify such things as suitability for children, the type of content, etc., are utilized during the process of searching for relevant pages.

The "title" is the title of the page.

For example, a particular log entry might be of the form:

```
<http://*/www.openmarket.com/home.html, 10/16/95
11:32a, (Rating/G, Category/Business/Internet/
Software, Class/Home-page}, (Open Market Home
Page1>.
```

Every day, each of Web servers 12 sends its daily logs to a master log server 14. The master log server merges the daily-logs from the Web servers into a master set of logs. These logs are the day log, the week log, the month log, and the year log. The day log contains all of the present day's daily logs as they arrive from Web servers, merged into a single log. Every midnight, the day log is merged into the week log, and the day log is cleared. Once a week, the week log is merged into the month log and the week log is cleared. Once a month, the month log is merged into the year log and cleared.

When entries from one log are rolled over into another log, e.g. from the day log into the month log, if both logs contain an entry for the same URL, the most recent entry should be retained and the older one discarded.

Master log server 14 indexes each of the master logs by each of the fields in the log entries (URL, time, content tags, and title). This enables fast searches.

Users at user computers 16 can use queries to search the master logs to find pages that are changed or new. A typical query might be as follows: Find all pages that are new or changed within the last week that are in Category /Business/Internet/Software. Each such page that is of interest to the user could reside on any of the thousands of Web servers 12 on network 10.

In one embodiment, user computers 16 transmits the queries directly to master log server 14 and master log server 14 transmits to the appropriate user computer 16 the entries that match the search pattern contained in the query transmitted by that user computer. In another embodiment, master log server 14 downloads its logs into each of user computers 16, and the queries are executed internally by user computers 16.

Thus, system 10 enables World Wide Web users to discover new or changed pages that might be of interest to them. For example, a consumer can find out whenever new pages appear concerning video cameras. An office-products salesman can find out whenever new businesses in a particular sales district publish new pages or change their old pages. A lobbyist for a certain company can monitor the pages of all local, state, and federal politicians and agencies for any references to the particular company or issues affecting the particular company.

The user queries are typically "standing queries," which are queries that are re-evaluated periodically (once a day, once a week, etc.). Daily queries are associated with the day log, weekly queries are associated with the week log, etc.

Immediately before master log server 14 rolls the day log over into the week log, the standing daily queries are matched against the day log and the results are sent back to the users. Similarly, immediately before the master log server rolls the week log over into the month log, the standing weekly queries are matched against the week log. Standing queries can also be evaluated at other times as desired by users.

In an alternative embodiment, master log server 14 maintains a larger set of logs: log-1, log-2, log-4, . . . log-2n. Log-1 contains entries for the present day. Every day, log-1 is rolled over into log-2. Every two days, log-2 is rolled over into log-4. In general, log-2i is rolled over into log-2i+1 every 21 days.

This structure of logs improves upon the daily/weekly/monthly/yearly structure because it avoids the weekly and monthly "hiccup" that occurs when the logs are rolled over. For example, once a month, the monthly log is rolled over into the yearly log and the monthly log is cleared. Thus, in the first day of the month, a user who asks "what's changed this month" may see only what has changed in the last day.

With the log-21 format, a user can ask what has changed in the last 30 days, for example. The system then matches the query against log-1, log-2, log -4, log-8, and log-16, which will yield pages that have changed in the last 32 days, which is the lowest power of 2 greater than 30.

In yet another embodiment, master log server 14 maintains a single master log of all data received from Web servers 12.

In certain embodiments, the logs are "compressed" by omitting detail before they are transmitted between Web servers 12 and master log server 14, or between the master log server and user computers 16.

For example, master log server 14 may send out to user computers 16 compressed logs that just list which Web servers 12 contain pages that have changed, along with the time of the most recently modified page on that server, for example:

```
<http://www.openmarket.com/*, 10/16/95 11:32a>
   <http://www.netscape.com/*, 10/16/95 12:45p>
   <http://www.src.dec.com/*, 10/16/95 10:43a>.
```

Users could use such a compressed log to determine which Web servers 12 have some content that has changed recently, even though the particular pages that have changed are not identified in the entries received by user computers 16.

The search pattern contained in the query from the user would include a time period specification and perhaps a partial URL, but would not include complete URLs, content tags, or titles.

In certain embodiments, Web servers 12 do not forward logs to master log server 14. The master log server computes log entries for Web servers 12 by directly querying the Web servers and comparing the current contents of the Web servers to the master log or logs, which indicate when the contents of each Web server was last noticed to change.

More generally, in certain embodiments Web servers 12 or master log server 14 compress logs to any level in the URL hierarchy, based on each particular Web server's content. For example, the daily log for the open Market Web server might be compressed as follows:

| | | |
|---|---|---|
| http://www.openmarket.com/what's-new/*, | 10/16/95 | 11:32a |
| http://www.openmarket.com/infor/*, | 10/14/95 | 4:54p |
| <http://www.openmarket.com/library/*, | 10/18/95 | 4:31a>. |

Figure 2:
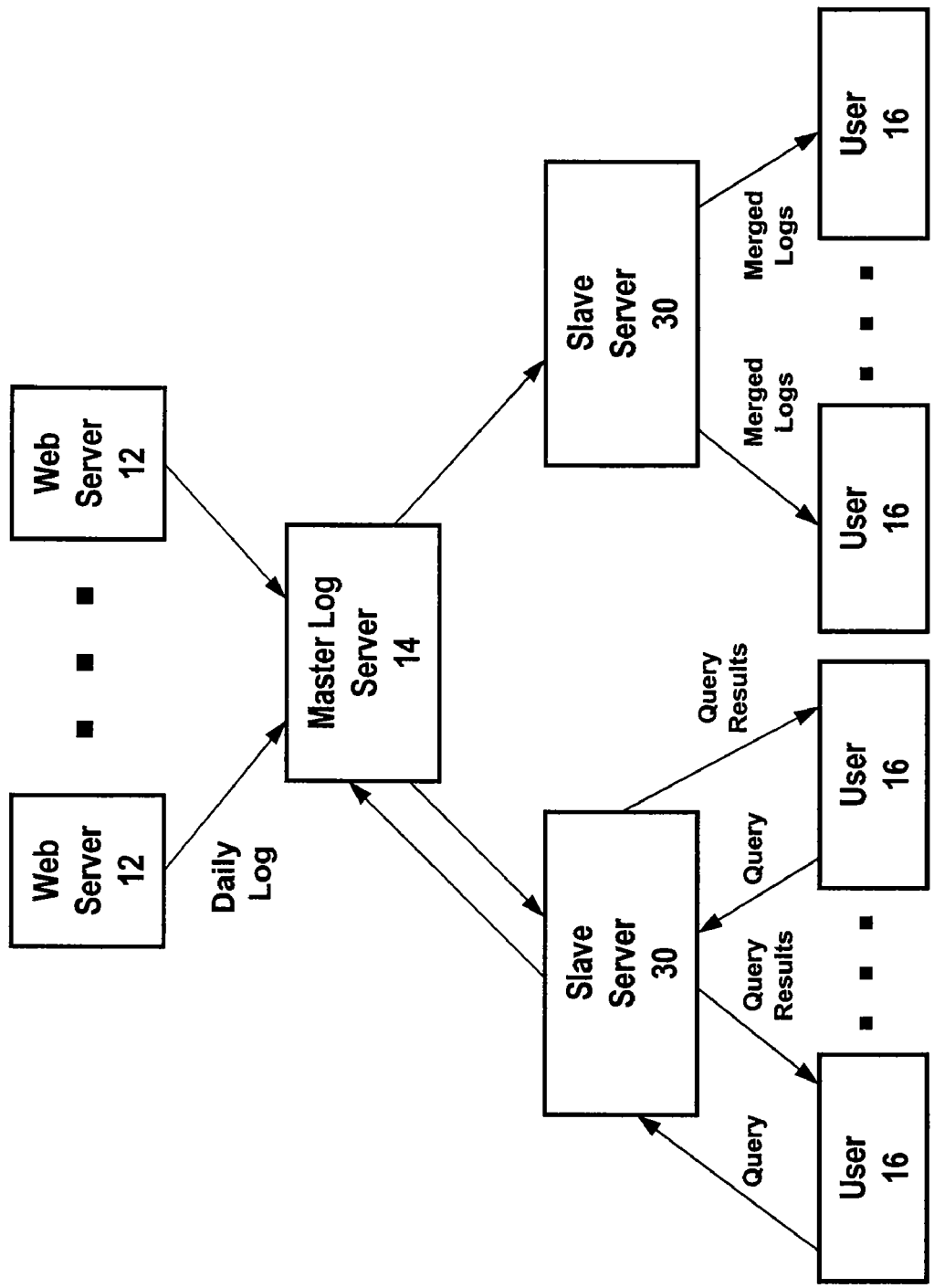
FIG. 2 is a diagram of another system for providing updated pages of information to users in accordance with the invention, in which the master server duplicates its master logs onto multiple slave servers.

With reference to FIG. 2, in another embodiment, master server 14 duplicates its master logs onto multiple slave servers 30. The slave servers execute user queries or redistribute the master logs to user computers 16 in the manner described above with respect to master server 14.

Once a day, master server 14 sends its day log to each of slave servers 30. Each slave server maintains its own copy of the day log, week log, month log, and year log, and does its own rolling over from day into week, week into month, and month into year. Each slave server also maintains its own indexes of the entry fields (URL, time, content tags, title). Slave servers 30 off-load much of the work from master server 14 and allow a greater flow of queries from user computers 16 to be executed, while reducing communications costs.

Figure 3:
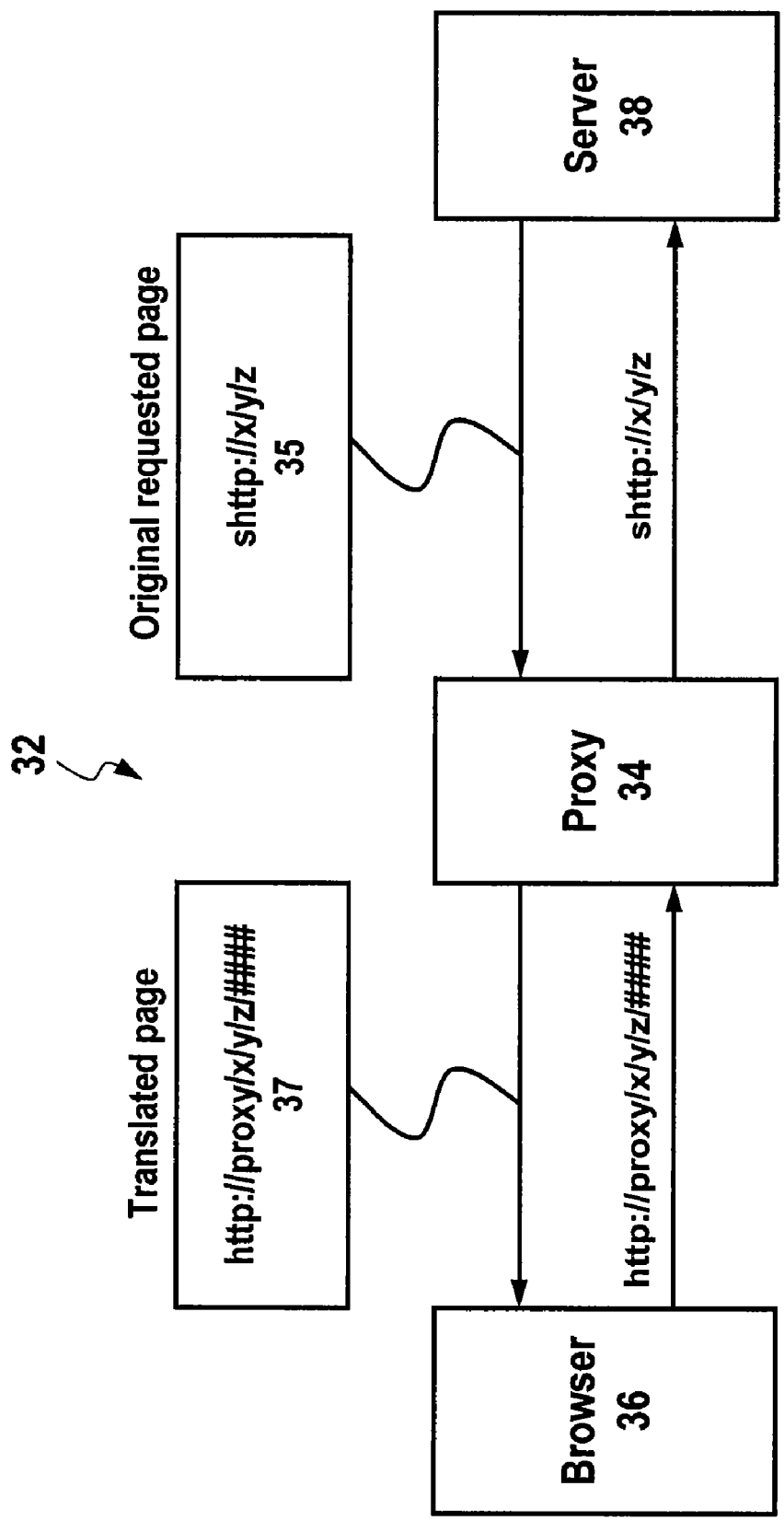
FIG. 3 is a diagram of a system for implementing security protocols on behalf of a network tool that does not implement them, in accordance with the present invention.

FIG. 3 shows a system for implementing security protocols on behalf of a network tool that does not implement them. In World-Wide Web network 32, a proxy server 34 is inserted between a user's Web browser 36 and network servers 38 on the Internet. Each user has a personal proxy server 34, which may be located on the same computer as the user's Web browser 36. Proxy server 34 intercepts all requests for pages (or other items of network-based information) made by browser 36 and all responses coming back from network servers 38. Proxy server 34 can execute the appropriate security protocols on behalf 5 of Web browser 36.

Many Web browsers and tools don't implement the new Web security protocols SSL, SHTTP, and PCT (a new standard protocol similar to SSL). These protocols are more complicated than the original and very simple Web protocols.

To implement the security protocols SSL, SHTTP, and PCT on behalf of a browser 36 that doesn't understand them, proxy server 34 examines each incoming page of information 35 requested by browser 36. Proxy server 34 translates all secure URLs on the page to special unsecure URLs and then forwards the translated page 37 to browser 36.

An SSL URL has the form: https://x/y/z. Proxy server 34 translates a secure URL of the form https://x/y/z to an unsecure URL of the form http ://PROXY/x/y/z/SSL.

An SHTTP URL has the form: shttp://x/y/z. In addition, a Web page containing SHTTP URLs must include additional information telling browsers how to access those URLs. That additional information appears in two places: in anchors and in tagged fields elsewhere on the page.

Anchors are special fields on an HTML page that contain URLs representing links to other pages (HTML is the language in which Web pages are written). An SHTTP anchor has the form:

---
<A href=shttp://x/y/z" S1=s1 S2=s2 . . . Sn=sn F1=f1
F2=f2 . . . Fn=fn> Click here to see this page. </A>.
---

The Si=si fields are name-value pairs describing SHTTP parameters to be used for accessing this particular URL, and the name-value pairs Fi=fi describe other aspects of the anchor unrelated to SHTTP.

The rest of the SHTTP information appears elsewhere on the page, in specially tagged fields of the form:

<Ti>. . . </Ti> where Ti is a tag specific to the SHTTP protocol.

When presented with a page containing a secure SHTTP URL, proxy server 34 rewrites the page, by removing the specially tagged SHTTP fields of the form <Ti>. . . </Ti> and by translating the SHTTP anchors into:

---
<A href=http://PROXY/x/y/z/SHTTP#####" S1=si S2=s2
 . . .     Sn=sn F1=f1 F2=f2       Fn=fn> Click here to see
this page. </A>.
---

The trailing component #####, which represents an encoding of the Si=si name-value pairs from the original anchor and the tagged fields <Ti>. . . </Ti>, is a string of letters and digits that encode data needed to reverse the translation and execute the security protocol to retrieve the URL. Any encoding scheme can be used that obeys the standard URL syntax.

When the user clicks on one of the translated unsecure URLs, the request to read its page is intercepted by proxy server 34. The prefix "PROXY/" identifies the JRL to the proxy server as a translation. The proxy server back-translates it to the original secure URL and executes the SHTTP secure protocol to request the page from network server 38.

In an alternative embodiment, instead of directly encoding the SHTTP parameters in the URL, proxy server 34 maintains a table with entries for each translated URL, each entry containing the Si=sn name-value pairs and the <Ti>. . . </Ti> fields. The ##### in the translation is replaced by the number of the corresponding table entry, rather than the contents of the entry.

Figure 4:
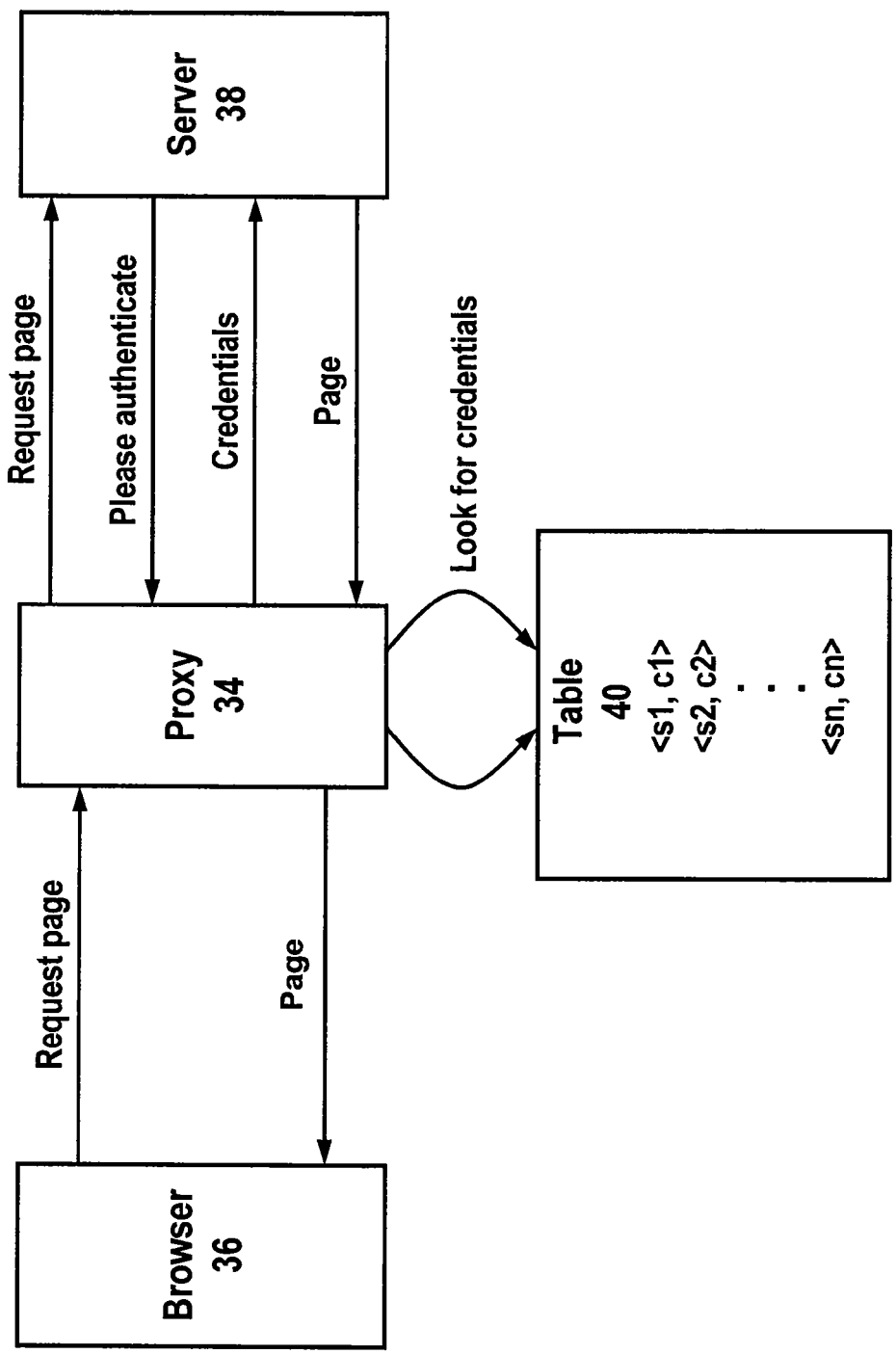
FIG. 4 is a diagram of the system of FIG. 3 illustrating how a proxy server manages authenticating credentials on behalf of a user in accordance with the invention.

With reference to FIG. 4, proxy server 34 can manage a user's authenticating credentials automatically on behalf of the user. When a user registers to use a subscription service on the Web, the user is assigned a set of credentials identifying the user to the service. The credentials may be a simple user ID and password or a public key and private key pair.

To manage the user's credentials automatically, the proxy server stores a table 40 of pairs <S, C>, where S represents the name of a subscription service's server and C represents the corresponding credentials for that service. The table is stored on/the user's computer and is protected by a single password or smart card. When the user first starts a Web session, proxy server 34 will ask the user to supply that secret.

When browser 36 requests a page (or other item of network-based information) from network server 38, proxy server 34 forwards the request to network server 38. Network server 38 may respond with a "please authenticate" message. At this point, browser 36 would ordinarily display a dialog box asking the user to type in a user ID and password. But, in the present invention, proxy server 34 looks in table 40 for credentials corresponding to network server 38 and sends them back to the network server. The network server replies with the requested page, which proxy server 34 forwards to browser 36.

In this way, proxy server 34 automatically executes the authentication on behalf of the user, without any notice or typing on the part of the user. This is important because a user often can't or doesn't want to use the same credentials for each of the service to which the user subscribes. As the number of such services grows, it is difficult for the users to manage all of their credentials.

Figure 5:
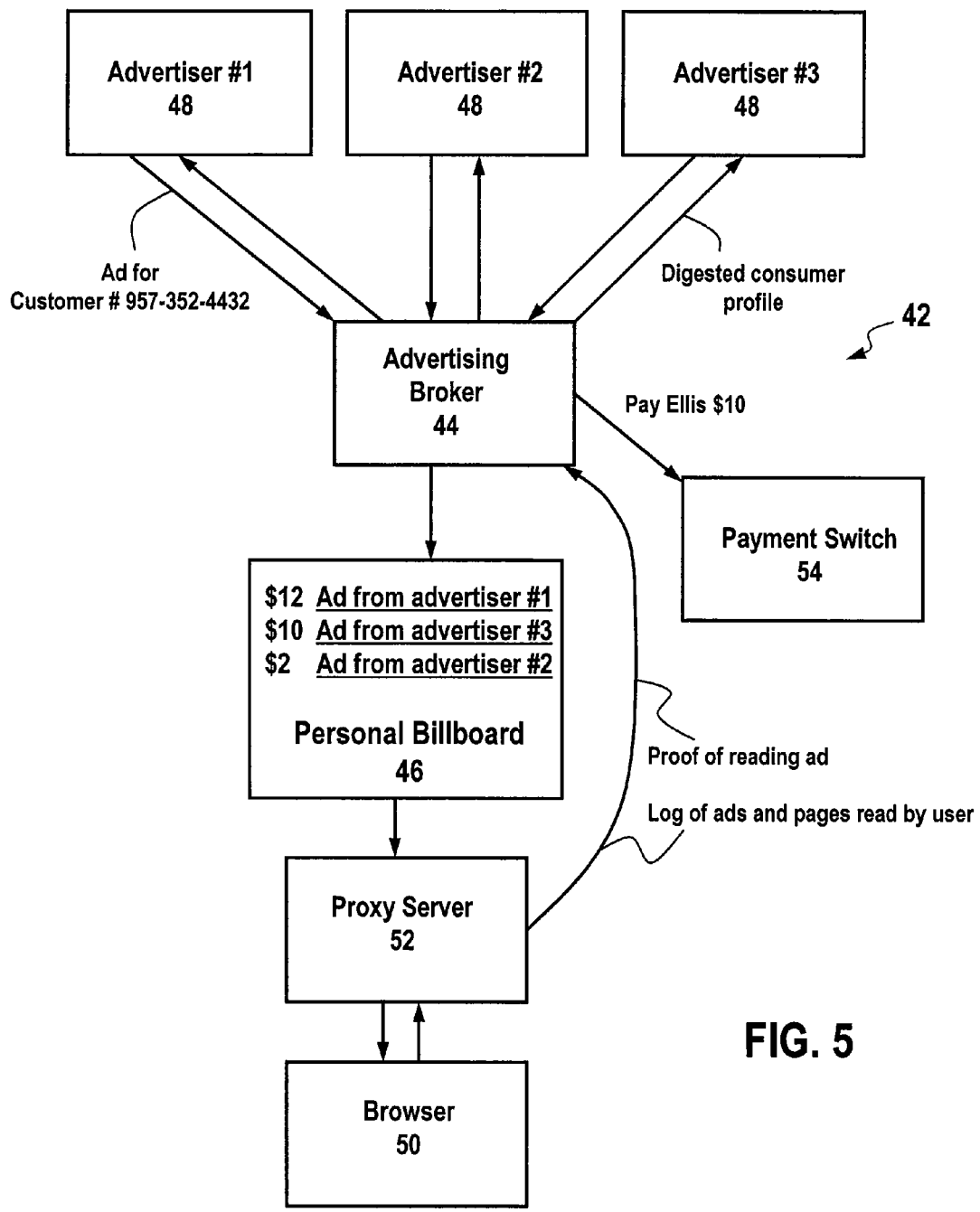
FIG. 5 is a diagram of a system for inducing advertisers to target their advertisements to consumers for whom the advertisements are likely to be of interest, in accordance with the invention.

FIG. 5 Is a diagram of a system 42 for inducing advertisers to target their advertisements to consumers for whom the advertisements are likely to be of interest. An advertising broker server 44 provides each consumer with a "personal billboard" 46, which is a Web page only that particular consumer can read. Network advertiser servers 48 bid for space on each consumer's billboard 46 with offers of cash and coupons for discounts on goods and services. Network advertiser servers 48 place ads on billboard 46 customized for the particular consumer, and the advertisements are ordered on the billboard by the amount of the bid. When a consumer reads the ad, the consumer receives the cash or coupon. Advertising broker server 44 receives a payment for each advertisement place on billboard 46 and each advertisement read by a consumer.

The consumer's actual name and mailing address may be provided to advertising broker server 44 when the consumer registers with the advertising broker server. Advertising broker server 44 and network advertising servers 48 can build profiles of individual consumers using traditional mailing lists, a survey filled out by the consumer when the consumer registers, or a record of the advertisements and Web pages the consumer actually reads.

In order to record which advertisements and Web pages the consumer reads, advertising broker server 44 provides a program that runs on the consumer's computer. The program is either the consumer's Web browser 50 itself, or a "proxy server" 52 that sits between Web browser 50 and the Internet. The program records all advertisements and pages the consumer reads, in a manner that ensures that a real person, rather than a computer program, has read each advertisement. Otherwise, clever users could write a program that reads every advertisement and collects the offered cash. The program may require the user to provide user authentication to advertising broker server 44.

There are a number of techniques for ensuring that a real person has read a particular advertisement, associated with differing degrees of security. For example, proxy server 52 could detect whether there were any mouse clicks or key clicks in a windows program immediately preceding, within a fraction of a second, a request from browser 50 to read a particular page. Alternatively, the pages of information might be set up in a manner such that the user must read several pages before receiving any money, and proxy server 52 could require that a user spend a certain amount of time (e.g., 30 seconds) reading each page. Alternatively, the pages may include forms and the user must fill out the form before receiving any money.

Many consumers would be concerned that detailed logs of what they read would be given to advertisers. There are two ways to solve this problem. In one embodiment, advertising broker server 44 digests the detailed reading logs provided to the advertising broker server by each user computer into abstract consumer profiles, which the advertising broker server then transmits to network advertiser servers 48, perhaps for a fee. In another embodiment, advertising broker server 44 assigns a unique number to each consumer, and the advertising broker server 44 gives the reading logs to network advertiser servers 48 keyed by the number rather than the consumer's name. Only advertising broker server 44 knows the correspondence between number and name. In either approach, the advertising brokerage service contractually promises never to disclose the consumer's identity without the consumer's permission.

Direct advertising on the Web removes the middleman of broadcast advertising. Traditionally, advertisers "pay" consumers to view their advertisements by subsidizing the cost of consumer entertainment such as television, radio, newspapers, and magazines. But, direct advertising on the Web spends that money directly on the consumer.

With direct advertising sent via U.S. mail, a successful response can cost a substantial amount of money. Direct advertising on the Web can be much, much cheaper, and so it can be expected that advertisers will be willing to spend some of that money in direct payments to consumers who read their advertisements.

The payments encourage the advertisers to closely target their advertisements to those consumers most likely to read them, and they signal to consumers the worth of the information contained in the advertisement. An advertiser that carefully targets its audience may be willing to offer a large amount of money to a consumer to read its advertisement. Such a large amount signals to the consumer that this advertisement is special in some way and most likely contains valuable information.

Consumers can be expected to like the personal billboard because it is unobtrusive in that consumers can read advertisements only when they wish to do so, because the consumer is likely to see advertisements that are of interest to the consumer, and because the consumer is paid for reading the advertisements.

Advertisers can be expected to like the personal billboards because they are relatively inexpensive, because they can efficiently target those consumers most likely to want their products, and because the advertisers can induce consumers to read the advertisements with cash and coupons.

One implementation of the system of FIG. 5 is exemplified as follows. Using customer profiles supplied by advertising broker server 44, a network advertiser server 48 submits to advertising broker server 44 an advertisement specifically targeted for a particular customer identification number. The advertisement is accompanied by an offer of a certain amount of money to be paid to the broker for placing the advertisement on billboard 46, a certain amount of money to be paid to the broker if the consumer reads the advertisement, and a certain amount of money to be paid to the consumer if the consumer reads the advertisement.

Advertising broker server 44 maps the consumer identification number to a particular consumer and places the advertisement on the consumer's personal billboard. The billboard is a Web page that is readable only by the consumer (standard Web security enforces this). The advertisements on the page are ordered according to the value of their bids.

Proxy server 52, which sits between the user's browser 50 and the network, filters all network traffic to and from the browser.

When the user reads an advertisement by clicking on its URL in browser 50, proxy server 52 verifies that a real user, rather than a computer program, is reading the advertisement, and, using encryption technology, sends proof to advertising broker server 44 that the user read the advertisement.

Advertising broker server 44 transmits a request to payment computer or switch 54 to pay the user the appropriate amount of money and to pay the broker the appropriate amount of money. The payment computer authenticates the payment request, and causes payment to be executed upon authentication of the payment request. This can be accomplished in the manner set forth in U.S. patent application Ser. No. 08/168,519, filed Dec. 16, 1993, and U.S. patent application Ser. No. 08/328,133, filed Oct. 24, 1994, the entire disclosures of which are hereby incorporated herein by reference.

Proxy server 52 records all advertisements and pages read by the user and periodically sends a log of these advertisements and pages to advertising broker server 44.

The advertising broker server 44 digests all of the usage logs of the users and sends consumer profiles, tagged by anonymous consumer identifiers, to network advertiser servers 48.

Figure 6:
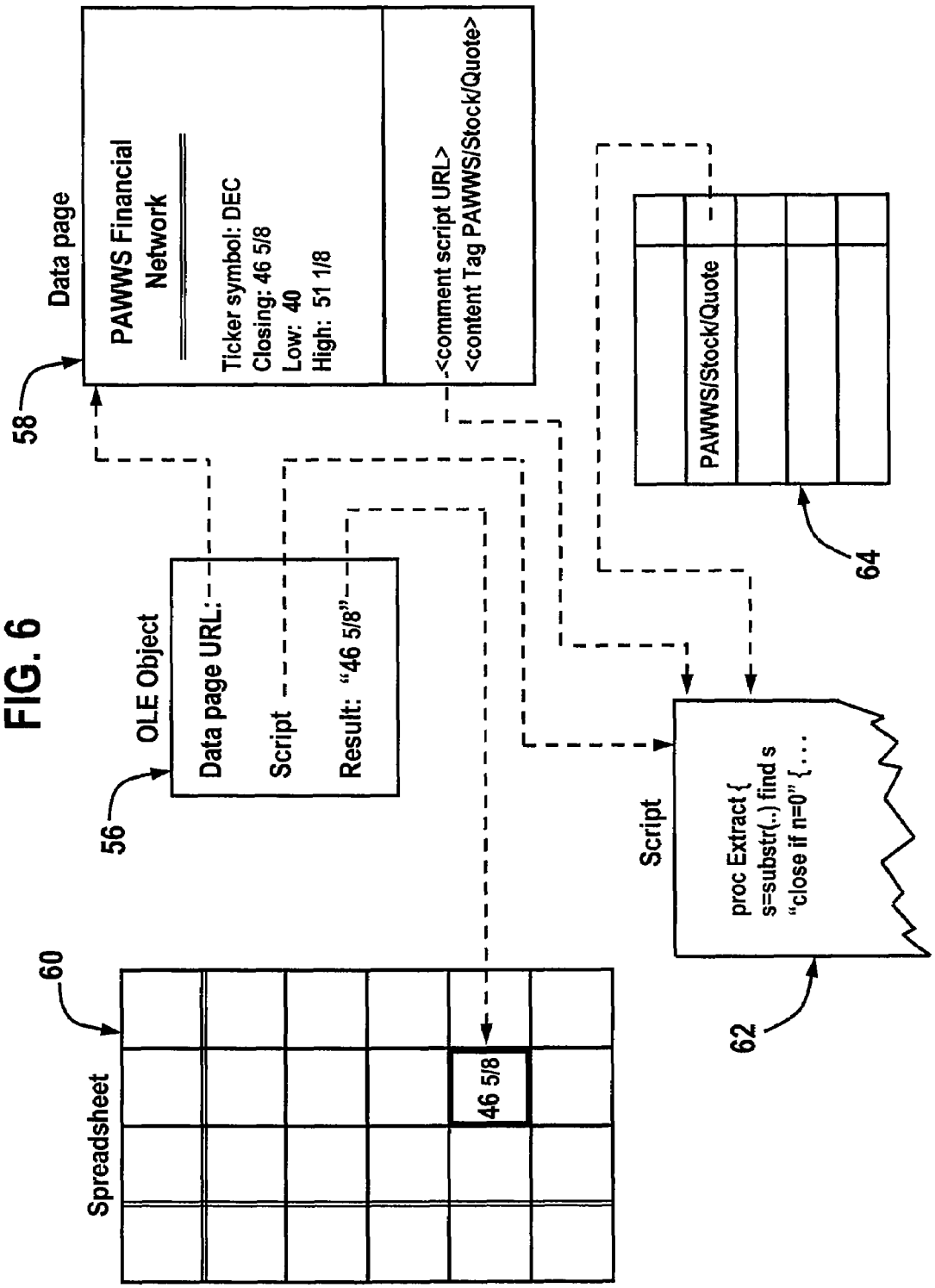
FIG. 6 is a diagram of a system for extracting information from pages of information on a communications network, in accordance with the invention.

FIG. 6 is a diagram of a system for extracting information from pages of information (or other items of network-based information) on a communications network. The system provides an OLE object 56 for extracting data from a page 58 or any other source of network-based information and embedding it in a document 60. OLE is Microsoft's standard method of building compound documents. OLE object 56 contains the URL of page 58 containing the desired data. OLE object 56 also contains a link from which the OLE object can locate a script program 62, written in a scripting language such as TCL that, when evaluated, extracts the desired data from data page 58.

OLE object 56 can be embedded within any compound document 60 such as a word-processor document or a spreadsheet. The result of applying script program 62 to data page 58 is inserted into compound document 60. Script program 62 may strip away useless content, or it may transform the content from one representation into another more suitable for the application. For example, the script program may convert an HTML table into a Microsoft Word table.

In general, each different kind of data page 58 will have a different script program 62. For example, there can 5 be one script for PAWWS stock quotes, another for National Weather Service weather reports, another for mortgage rates published in the Mercury News, etc. Script programs can be associated with data pages 58 in a number of different ways.

For example, a user or vender can write a particular script program 62 for a particular page 58 or class of pages and bind that script program 62 into OLE object 56.

Alternatively, the URL of a page containing script program 62 can be encoded in data page 58 in special HTML (Hypertext Markup Language) comments, which a browser normally doesn't show to the user. OLE object 56 looks for the special comments, retrieves the contents of the page referenced by the URL in the comments, and uses the contents as a script. This approach is appropriate when the provider of data page 58 also supplies script program 62.

Alternatively, data page 58 is tagged with a content tag describing the type of the page, for example, PAWWS/Stock/Quote. Using a table 64 on the side, OLE object 56 maps the content tag to a script program 62. This is appropriate when the script program is supplied by a third party that doesn't have access to the contents of data page 58.

Script program 62 is digitally signed by a trusted third party, certifying that the script is safe to execute and is not a virus or malicious program. Such certification is a known technique.

The invention is also applicable to other compound document architectures other than OLE, such as, for example, OpenDoc.

It can be seen that the extracted information can exclude the extraneous content of most information on the Web that makes pages of information pleasing to read within Web browsers. In other words, these pages of information are not in a "raw" form suitable for use with other applications such as spreadsheets.

As an example of a situation in which the object embedding is useful, the PAWWS Financial Network provides up-to-date stock quotes over the Web. A financial analyst can include some quotes in a spreadsheet that gets updated every day, without having to manually cut and paste quotes from the Web page into the spreadsheet. The analyst can automatically extract the closing price for a given company from a page of information corresponding to that company, and can insert the closing price into the spreadsheet in such a way that when the contents of the page are changed, the corresponding contents of the spreadsheet are changed.

Script program 62 can be configured to automatically notice when page 58 changes, by, for example, polling the page on a regular basis. When page 58 changes, script program 62 recomputes the result it provided as part of compound document 60, and calls the compound document manager to have the compound document updated and optionally displayed.

As another example, a real-estate agency can give its customers a printed flyer listing current mortgage rates for several of the local banks, extracted from a larger listing published on the Web by the city newspaper. The real-estate agency can update the flyer every week without cutting and pasting from the newspaper Web page.

There have been described systems and methods for managing transfers of information in communications networks. It will be apparent to those skilled in the art that numerous modifications of and departures from the specific embodiments described herein are possible without departing from the inventive concepts set forth in the claims.

What is claimed is:

1. A system for extracting data from sources of network-based information in a packet-switched communications network comprising a plurality of network servers programmed to transmit network-based information over said network, comprising:

a computer, coupled to said communication network;

a script program, implemented on a computer in said communications network, structured to extract a portion of data from network-based information received from one of said network servers; and an object embedding program, implemented on one of the computer and a second computer in said communications network, comprising a link to said network-based information and a link from which said object embedding program can locate said script program, wherein the object embedding program executes said script program to cause said portion of data to be extracted from said network-based information, and to embed said portion of data within a compound document, wherein said link from which said object embedding program can locate said script program is said link to said network-based information, and wherein said network-based information in turn comprises a link to said script program.

2. A system in accordance with claim 1, wherein said link from which said object embedding program can locate said script program comprises a direct link to said script program.

3. A system in accordance with claim 1, wherein said link comprises a universal resource locator.

4. A system in accordance with claim 1, wherein said computer on which said object embedding program is implemented comprises said computer on which said compound document is implemented.

5. A system in accordance with claim 1, wherein said network-based information is a page of information.

6. A method of extracting data from network-based information in a packet-switched communications network comprising the steps of:

executing an object embedding program to locate a script program from a link in said object embedding program;

applying said script program to network-based information, provided by a network server, to which said object embedding program is linked by a link in said object embedding program, and applying said script program to said network-based information;

executing said script program to extract a portion of data from said network-based information provided the network server; and continuing to execute said object embedding program to embed said portion of data within a compound document, wherein said link from which said object embedding program can locate said script program is said link to said network-based information, and wherein said network-based information in turn comprises a link to said script program.

7. The method of claim 6, wherein said link from which said object embedding program can locate said script program comprises a direct link to said script program.

8. The method of claim 6, wherein said link comprises a universal resource locator.

9. The method of claim 6, wherein said network-based information is a page of information.

10. A system for extracting data from sources of network-based information in a packet-switched communications network comprising a plurality of network servers programmed to transmit network-based information over said network, comprising:

a computer, coupled to said communication network;

a script program, implemented on a computer in said communications network, structured to extract a portion of data from network-based information received from one of said network servers; and an object embedding program, implemented on one of the computer and a second computer in said communications network, comprising a link to said network-based information and a link from which said object embedding program can locate said script program, wherein the object embedding program executes said script program to cause said portion of data to be extracted from said network-based information, and to embed said portion of data within a compound document, wherein said link from which said object embedding program can locate said script program comprises said link to said network-based information, and wherein said network-based information comprises an identification of a table comprising a link to said script program.

11. The system of claim 10, wherein said link from which said object embedding program can locate said script program comprises a direct link to said script program.

12. The system of claim 10, wherein said link comprises a universal resource locator.

13. The system of claim 10, wherein said network-based information is a page of information.

14. A method of extracting data from network-based information in a packet-switched communications network comprising the steps of:

executing an object embedding program to locate a script program from a link in said object embedding program;

applying said script program to network-based information, provided by a network server, to which said object embedding program is linked by a link in said object embedding program, and applying said script program to said network-based information;

executing said script program to extract a portion of data from said network-based information provided the network server; and continuing to execute said object embedding program to embed said portion of data within a compound document, wherein said link from which said object embedding program can locate said script program comprises said link to said network-based information, and wherein said network-based information comprises an identification of a table comprising a link to said script program.

15. The method of claim 14, wherein said link from which said object embedding program can locate said script program comprises a direct link to said script program.

16. The method of claim 14, wherein said link comprises a universal resource locator.

17. The method of claim 14, wherein said network-based information is a page of information.

* * * * *